United States Patent
Pawlowsky

(10) Patent No.: US 8,453,239 B2
(45) Date of Patent: May 28, 2013

(54) SECURE THIRD PARTY SCRIPTING ENVIRONMENT

(75) Inventor: Marc Andrew Pawlowsky, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 25 days.

(21) Appl. No.: 13/164,571

(22) Filed: Jun. 20, 2011

(65) Prior Publication Data

US 2012/0054861 A1  Mar. 1, 2012

(30) Foreign Application Priority Data

Aug. 25, 2010 (CA) ...................................... 2711855

(51) Int. Cl.
*G06F 11/00* (2006.01)

(52) U.S. Cl.
USPC ............................................ 726/22; 717/114

(58) Field of Classification Search
USPC ................... 726/22–24; 717/114, 136, 137
See application file for complete search history.

(56) References Cited

U.S. PATENT DOCUMENTS

| 7,272,753 | B2* | 9/2007 | Kaplan et al. ................. 714/38.1 |
| 7,373,595 | B2 | 5/2008 | Jones et al. |
| 7,386,567 | B2 | 6/2008 | Manikutty et al. |
| 7,444,678 | B2 | 10/2008 | Whitmer et al. |
| 7,539,981 | B2 | 5/2009 | Eilebrecht |
| 7,559,080 | B2 | 7/2009 | Bhargavan et al. |
| 7,607,172 | B2 | 10/2009 | Zurko et al. |
| 7,624,373 | B2 | 11/2009 | Pandit et al. |
| 8,032,828 | B2* | 10/2011 | Su et al. ........................ 715/235 |
| 2004/0205411 | A1 | 10/2004 | Hong et al. |
| 2005/0138606 | A1* | 6/2005 | Basu et al. .................... 717/136 |
| 2008/0148298 | A1 | 6/2008 | Chatterjee et al. |
| 2009/0112901 | A1 | 4/2009 | Friedman |

FOREIGN PATENT DOCUMENTS

| CN | 1877525 A | 12/2006 |
| EP | 1 596 557 A2 | 11/2005 |
| EP | 2 053 502 A2 | 4/2009 |
| WO | 2007/058882 A2 | 5/2007 |
| WO | 2011/037500 A1 | 3/2011 |

OTHER PUBLICATIONS

U.S. Appl. No. 13/224,076, filed Sep. 1, 2011, Marc A. Pawlowsky.
Su et al. "XEM: Managing the Evolution of XML Documents", International Workshop on Research Issues in Data Engineering, Apr. 2, 2001, Heidelberg, Germany, (8 pages).
Canadian Office Action from Application No. 2,711,855, dated Nov. 9, 2010 (4 pages).
Karl Mazurak et al., "ABASH: Finding Bugs in Bash Scripts," PLAS '07 Proceedings of the 2007 Workshop on Programming Languages and Analysis for Security (2007) pp. 105-114.
Lincoln D. Stein, "SBOX: Put CGI Scripts in a Box," Proceedings of the USENIX Annual Technical Conference, The USENIX Association, Jun. 1999 (23 pages).

* cited by examiner

*Primary Examiner* — Beemnet Dada
(74) *Attorney, Agent, or Firm* — Shumaker & Sieffert, P.A.

(57) ABSTRACT

An illustrative embodiment of a computer-implemented method for securing a third party scripting environment receives a document to form a source input, defines a schema with functionality of an underlying target script language, applies the schema to the source input to generate clean language definitions and translates the clean language definitions into a translated script of the target script language.

20 Claims, 4 Drawing Sheets

SECURE THIRD PARTY SCRIPTING ENVIRONMENT

TECHNICAL FIELD

This disclosure relates generally to scripting environments in a data processing system.

BACKGROUND

An open web service capable of executing scripts in which an execution environment is provided by a third party is a typical requirement. However, the execution environment provided may allow unsafe operations, such as, accessing the file system. The input provided to the web service may not arrive from a trusted source. The input provided may even be actively hostile causing damaged systems and compromised data resources.

A known approach to solving the potential problem of unsafe script operation uses chroot, an operation on UNIX®[1] systems to change the apparent disk root directory for the current running process and associated child processes and run a command. However, for other environments such as Windows®[2] the chroot option is not applicable.

[1]Registered trademark of The Open Group.
[2]Windows is a registered trademark of Microsoft Corporation in the United States and other countries.

Another typical approach to secure script execution uses a parser for the target language to catch dangerous operations using a technique referred to as a black list. However, as with any black list, obtaining certainty that all dangerous attacks are eliminated is difficult to achieve and harder to maintain. Creation and maintenance of a specialized parser for filtering is typically very difficult. A black list approach is also vulnerable when an underlying target is upgraded, because new commands and options may be added but are not restricted.

The blacklist approach requires prior knowledge of elements to be restricted. Environments with frequent changes require continued timely updates to a parser to catch dangerous operations. Only those operations deemed to be dangerous can be trapped and prevented. Unknown operations may be problematic, but the status of the operation is not known until after the operation has executed. The timing of awareness may be too late to protect the system. For example, in many computer virus incidents when a damaging operation is known to exist poor application of a trap for the damaging operation typically leads to system problems. Unknown malicious operations or malicious use of known operations typically cause problems for a system in which the operation is performed.

BRIEF SUMMARY

According to one embodiment, a computer-implemented method for securing a third party scripting environment receives a document to form a source input, defines a schema with functionality of an underlying target script language, applies the schema to the source input to generate clean language definitions and translates the clean language definitions into a translated script of the target script language.

According to one embodiment, a computer program product for securing a third party scripting environment comprises a computer-readable medium containing computer executable program code stored thereon. The computer executable program code comprises computer executable program code to receive a document to form a source input, computer executable program code to define a schema with functionality of an underlying target script language, computer executable program code to apply the schema to the source input to generate clean language definitions and computer executable program code to translate the clean language definitions into a translated script of the target script language.

According to one embodiment, an apparatus for securing a third party scripting environment comprises a communications fabric, a computer-readable medium connected to the communications fabric, wherein the computer-readable medium contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a document to form a source input, define a schema with functionality of an underlying target script language, apply the schema to the source input to generate clean language definitions and translate the clean language definitions into a translated script of the target script language.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
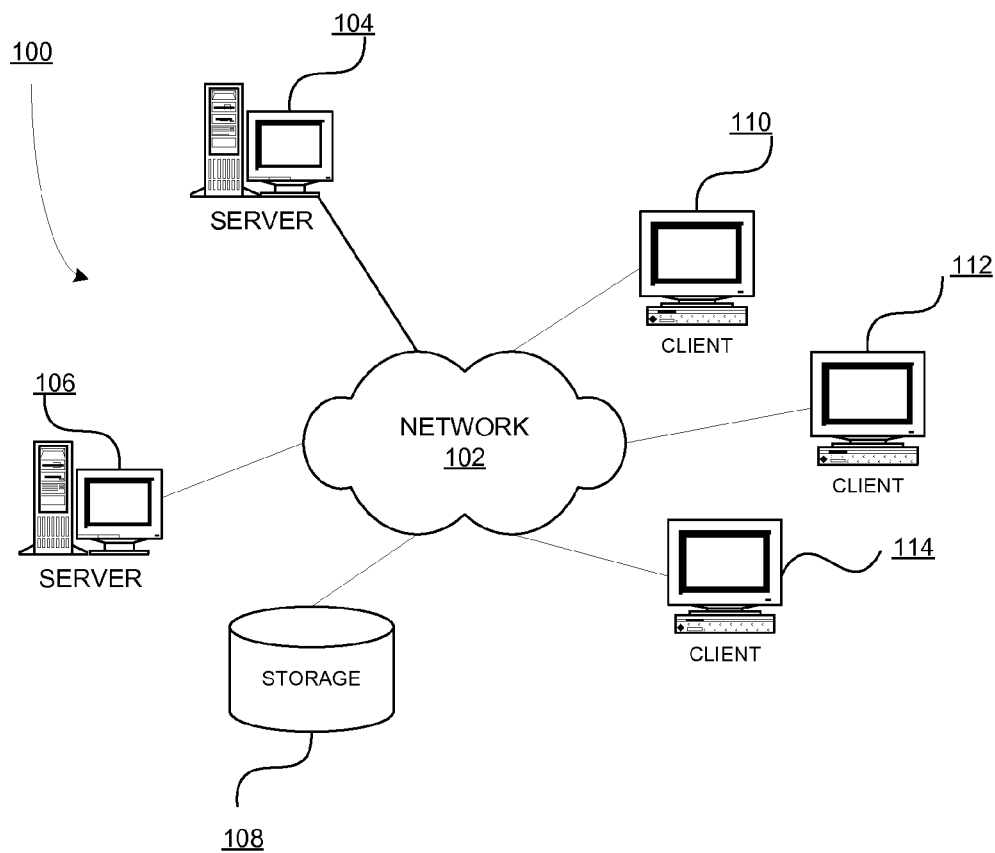
FIG. 1 is a block diagram of an exemplary network of data processing systems operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational acts to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, acts, operations, elements, and/or components, but do not preclude the presence or addition of one or more other features, integers, acts, operations, elements, components, and/or groups thereof.

Figure 2:
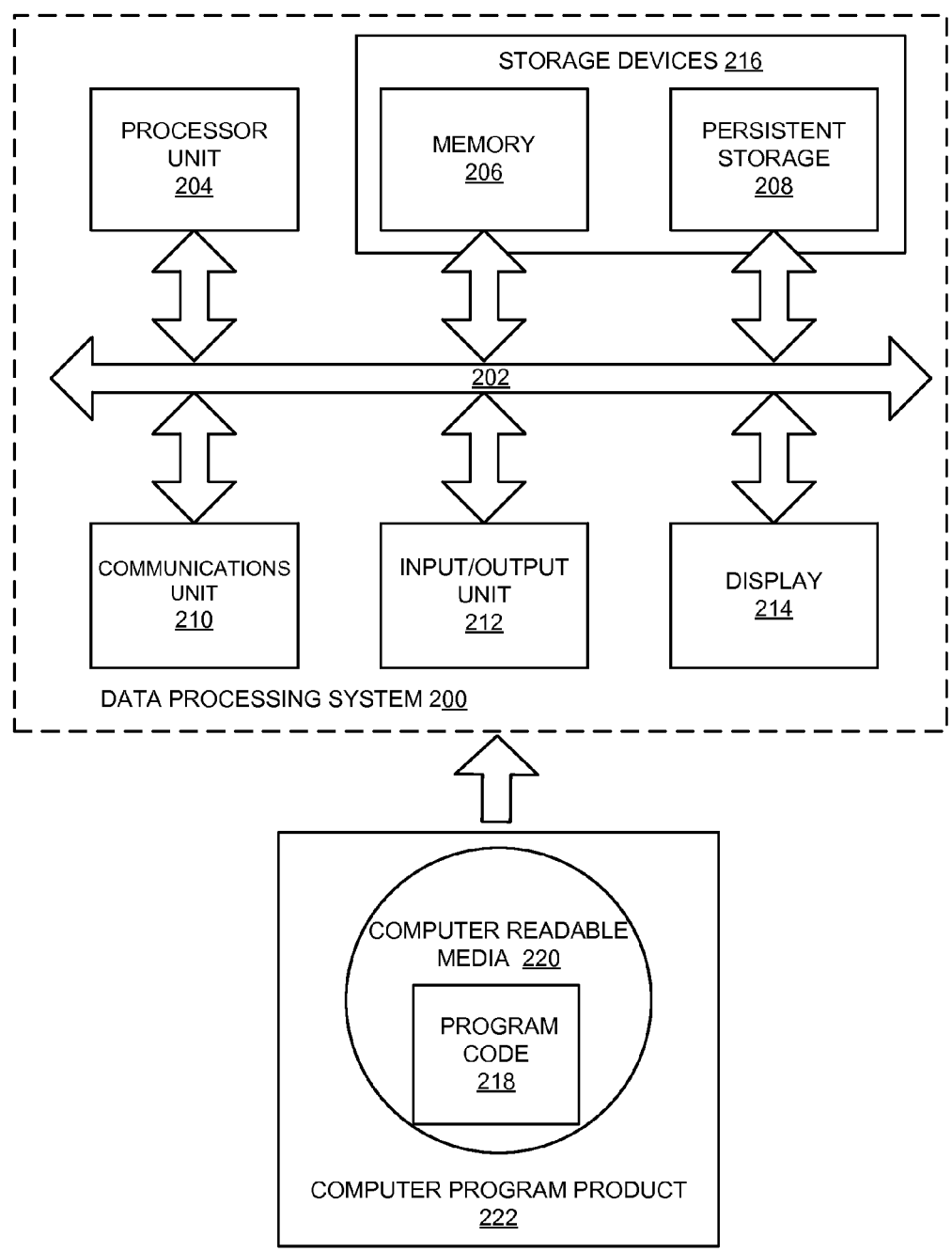
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, computer executable instructions or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a storage media of persistent storage, such as a hard drive, a thumb drive, or a flash memory that is connected to data processing system 200. The tangible form of computer readable media 220 may, in some embodiments, also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

According to an illustrative embodiment using data processing system 200 of FIG. 2 as an example, processor unit 204 executes a computer-implemented process for securing a third party scripting environment receives a document to form a source input through communications unit 210, input/output unit 212, display 214 or storage devices 216. Processor unit 204 defines a schema with functionality of an underlying target script language; wherein the schema allows only identified operations. The schema may be stored in storage devices 216. Processor unit 204 applies the schema to the source input to generate clean language definitions. Clean language definitions may also be stored in storage devices 216. Processor unit 204 translates the clean language definitions into a translated script of a target script language for execution in a third party execution environment.

In an alternative embodiment, program code 218 of FIG. 2 containing the computer-implemented process may be stored within computer readable media 220 as computer program product 222. In another illustrative embodiment, the process for securing a third party scripting environment may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 3:
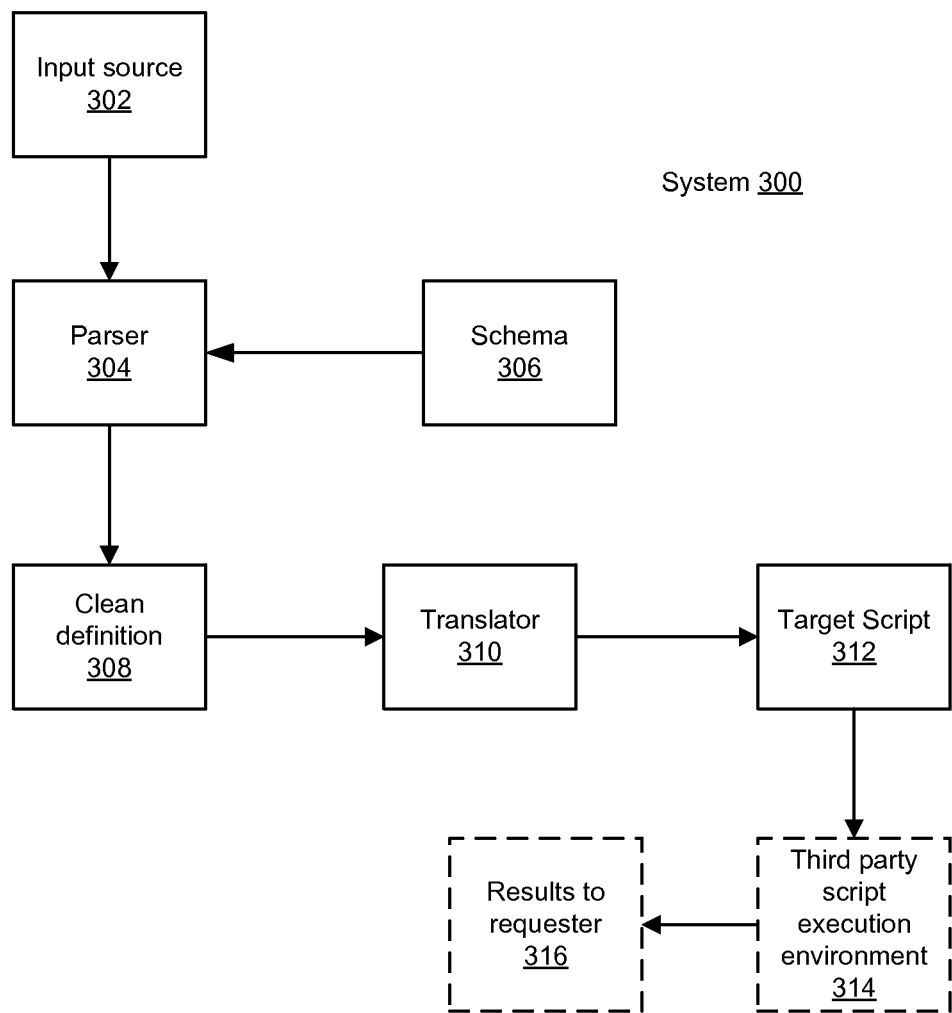
FIG. 3 is a block diagram of a validator translator system in accordance with various embodiments of the disclosure.

With reference to FIG. 3, a block diagram of a validator translator system, in accordance with various embodiments of the disclosure is presented. System 300 is an example of a web service XML schema validation and translation system used to secure a third party scripting environment.

System 300 comprises a number of interconnected components working in cooperation with an underlying operating system software and hardware. System 300 components include components comprising input source 302, parser 304, schema 306, clean definition 308, translator 310, and target script 312. Third party script execution environment 314 is an optional component and is typically not part of system 300.

Input source 302 is a programming language construct containing command and data references to be executed. In the following examples, the input is a script for execution in third party execution environment 314. Results to requester 316 are the output of execution of target script 312 using third party script execution environment 314.

Parser 304 processes information received in the form of input source 302 using rules contained in schema 306 to produce an intermediate output of clean definition 308. Parser 304 is typically a parser for XML input. Translator 310 processes clean definition 308 to generate target script 312. Target script 312 executes within third party script execution environment 314 to create results to requester 316. The requester may have provided input source 302 or invoked an operation using input source 302.

The example process using parser 304 and schema 306 for documents is an enhanced white list based process in which only safe operations or data are allowed. Translation engine of translator 310 is typically simple in nature to handle XML based translations.

The example process described introduces a new XML schema of schema 306, used to generate documents in clean definition 308 that are translated to a target scripting language. The definitions or rules of schema 306 restrict the usage of dangerous operations, but otherwise allows the power of the base scripting system to be used. Schema 306, an XML schema in the example, is constructed to reproduce all the functionality of the target scripting language, minus dangerous operations. Documents implemented with schema 306 are translated using translator 310 to a target scripting language of target script 312 and executed within third party scripting execution environment 314 with results returned to the user or requester.

Third party scripting execution environment 314 is not covered in the disclosure and may or may not be included in system 300. The process of system 300 completes with the generation of target script 312.

An example implementation of system 300 using SPSS®[3], a computer program for statistical analysis, provides a concrete example of a target system in which a web service allows SPSS scripts to be executed safely. For example, in SPSS scripting a statement, HOST COMMAND allows an arbitrary host command to be executed. This command can reveal, destroy, or corrupt sensitive information in the system in which the command executes. An operating system may be compromised leading to further attacks. The attack vector is handled by not having a representation of the problematic command contained within a controlling schema definition, such as schema 306.

[3]IBM and SPSS are trademarks of International Business Machines Corp., registered in many jurisdictions worldwide.

Other commands within the SPSS command set enable writing results of command processing to a file system enabling the results to be used in later steps. For example, in the code snippet REGRESSION DEPENDENT=Y
/METHOD=ENTER X1 X2
/OUTFILE CORB ('/data/covx1x2y.sav').

To protect against this occurrence the schema definition of schema 306 is defined to not allow directories in the file names. During a translation operation by translator 310, directories are added to the files defining a directory for each session. Reading of saved results is handled in a similar manner, restricting the input of any command to only be received from a previously stored result. For commands using files provided by the environment as part of the input to the command, such as graphic templates, the schema is restricted to use only the file name. File names are restricted to only specific files for which access is allowed, and the directory is added at translation time. For example, GGRAPH
/GRAPHDATASET NAME="graphdataset" VARIABLES= jobcat COUNT()/GRAPHSPEC
SOURCE=GPLFILE("/spss/simplebarchart.gpl").

The translator operation may provide additional security restrictions as needed. For example, translator 310 may be used to further add statements during the translation process to restrict resource consumption allowed, such processor resource or memory.

In the described process of the disclosure an enhanced white list approach is described in which only non-harmful content is allowed. Prior solutions typically used a black list approach in which harmful content is detected. The difference is that content in the disclosed process of system 300 has to be vetted as safe before being allowed, versus an after the fact finding of dangerous content of prior solutions. Determining whether the script content is safe is particularly relevant where the content definition and interpretation is not within control of a first party, as in the example implementation. Prior solutions typically performed a modification of a document. The disclosed process does not rely on document modification. Using the disclosed process of system 300 a dangerous document is rejected outright. In another example of prior solutions, a document may be modified before transmission over a network. However a potentially hostile agent may further be used to transmit the modified document, and therefore not be trusted to make the document harmless.

Previous solutions typically performed an XML to XML transformation. Using the disclosed process of system 300 an inter-language translation of XML to the target language of SPSS is performed in a current example. For example, the following code snippet may be used to convert XML to the target script language:

```
Void process (InputStream theRequest) {
Document doc = readAndValidateDocument (theRequest);
Element root = doc.getroot ( );
For (Element child : root.getChildElements ( ) ) {
convert (child);
}
}
Void convert (Element elem) {
String name = getName (elem);
If (name == "cancatenate") {
```

-continued

```
concatenate (elem)
else if (name == "delete) {
delete (elem); } else {
Internal Error ("Document should not have passed schema validation")
}
Void concatenate (Element catCommand) {
Elem child = getChild (catCommand);
String baseName = getText (child);
File file = nameTofile (baseName);
String relativePath = getRelativePath (file);
Print ("cat ");
Print (relativePath);
Print ("\n");
}
```

Using the example a schema, such as schema 306, allows for one command, concatenate takes a single parameter, which is the name of a file that is to be present in the sandbox is presented. The file name further cannot have a path associated.

```
<xs:schema xmlns:xs="http://www.w3.org/2001/XMLSchema"
elementFormDefault="qualified" attributeFormDefault="unqualified">
<xs:element name="commands"> <xs:annotation>
<xs:documentation>Commands that will be executed</xs:documentation>
</xs:annotation>
<xs:complexType> <xs:choice>
<xs:element name="concatenate"> <xs:complexType>
<xs:all>
<xs:element name="file" type="fileNameType"/> </xs:all>
</xs:complexType> </xs:element>
</xs:choice> </xs:complexType>
</xs:element> <xs:simpleType name="fileNameType">
<xs:annotation> <xs:documentation>Representation of a file name that
will be created in a safe
place, so it can be used within a request. The name is tightly restricted so
it cannot escape the safe area.
</xs:documentation> </xs:annotation>
<xs:restriction base="xs:token"> <xs:whiteSpace value="collapse"/>
<xs:minLength value="1"/> <xs:maxLength value="60"/> <xs:pattern
value=" [0-9a-zA-Z_] [0-9a-zA-Z_] * (\.? [0-9a-zA-Z_] * ) ?"/>
</xs:restriction> </xs:simpleType>
</xs:schema>
```

The code snippet of the example schema defines a restriction preventing use of directory separators or any characters indicating an end of a command into the permitted file name. Other restrictions may be defined in a schema of the example include the specific order of commands. While a target environment may fail when commands are not placed in the correct order, the rules of the schema definitions can be used to make an attack more difficult.

For example, an attacker may slip additional commands or arguments through an existing schema validation by encoding certain characters, similar to a technique used by hackers when attacking web applications (for example, path traversal tricks, and encoded CR-LF with additional commands afterwards).

The XML schema of the disclosed process protects against manipulating the file system outside of the sandbox. The example schema completely restricts the file name to not allow white space, or directories and is overly restricted to be safe. For example, the schema described does not allow Japanese.

In the example of the disclosed process, two types of files are allowed: user generated data files, and predefined files. User generated data files can be created within the request, and then reused within the same request. The process creates a directory sandbox that is used for each request. Inside the sandbox a directory is created for the user generated data. A java.io.File is created with a parent directory being a data file of the sandbox, and the name of the file being passed by the user. Although the schema does not allow the use directories, the process can provide additional security checks by verifying the parent of the created File object is indeed in the data area of the sandbox. The File object is used in generation of target script 312.

Template files may be further restricted to allow only predefined names using an xs:enumeration. The process for generating the path for a template is similar to the process described for user generated data files.

Nothing is added to the schema, until the added content is determined to be safe. When a security change is to be implemented, the schema can be updated and deployed, possibly without having to write any other code.

Figure 4:
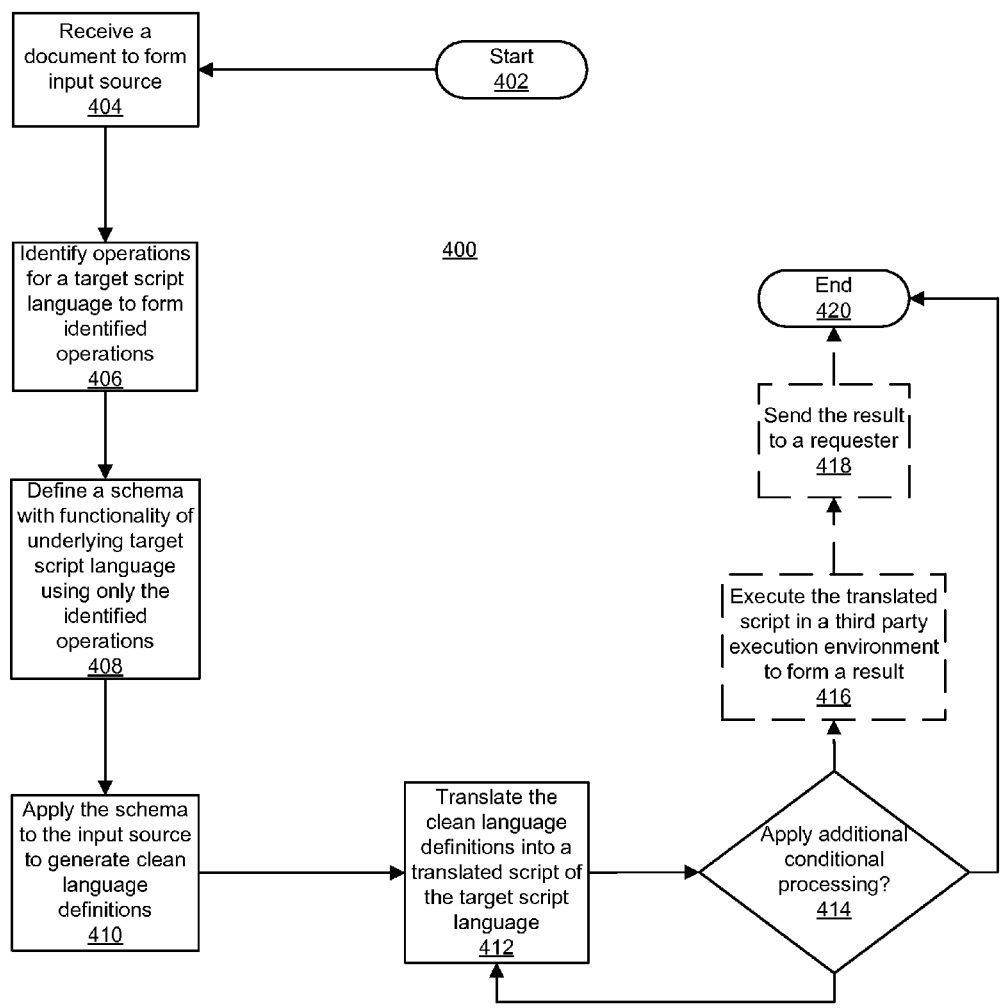
FIG. 4 is a flowchart of a process using the system of FIG. 3 in accordance with one embodiment of the disclosure.

With reference to FIG. 4, a flowchart of a validation translation process, in accordance with one embodiment of the disclosure is presented. Process 400 is an example of a validation and translation process using system 300 of FIG. 3.

The disclosed process using XML schema provides a more granular control over the logic and syntax of code that is permitted to pass through to a third party interpreter or execution environment. The disclosed process extends the concept of white listing to include explicit fine-grained control of input content received.

Process 400 begins (act 402) and receives a document to form an input source (act 404). Document also includes a reference to files and is not limited to a traditional office type document. Process 400 identifies operations for a target script language to form identified operations (act 406). The identified operations are specific operations permitted during processing of a target script and typically form a subset of all scripting operations for a given scripting language. The identified operations enable the target script to process only those operations explicitly allowed because those operations are the only operations provided to the script processor. The identification and permission of allowed operations accordingly defines what is safe. Only the identified operations are deemed safe in the target script language. The third party execution environment is capable of processing identified operations and unidentified operations, wherein unidentified operations are deemed unsafe.

The identification enables execution control of a third party execution environment through a clean script input. Accordingly the target script process does not have to take corrective action after a dangerous operation is executed because the dangerous operation would not have been permitted.

Using process 400 a schema is defined with functionality of an underlying script language (act 408). The schema may allow only the identified operations. The identified operations result from the process of act 406. The schema definitions subset the operations available in the target scripting language to only those identified as safe.

Process 400 applies the schema to the input source to generate clean language definitions (act 410). The clean language definitions are created as an intermediate form enabling subsequent processing. The content of the clean language definitions does not permit operations other than the identified operations permitted to execute in the target script.

Process 400 translates the clean language definitions into a translated script of the target script language (act 412). The inter-language translation enables an intermediate form for execution in a target script environment. Process 400 determines whether to apply additional conditional processing (act 414). For example, additional conditional processing may include application of further controls, filters or constraints to restrict processing to predetermined amounts of processor or memory utilization. Other data processing resources may be restricted or denied using the process.

When a determination is made to apply additional conditional processing, a "yes" result is obtained. When a determination is made to not apply additional conditional processing, a "no" result is obtained. When a "yes" result is obtained, process 400 loops back to act 412 and applies a specific additional conditional processing. When a "no" result is obtained, process 400 terminates (act 420).

Process 400 may optionally execute the translated script in a third party execution environment to form a result (act 416). Process 400 may also optionally send the result to a requester (act 418) and terminate thereafter (act 420) as before. Act 416 and act 418 are optional because the third party execution environment is beyond the scope of the disclosure. For example, the third party execution environment is a web service for which process 400 has prepared a translated script comprising only safe operations (commands, data creation and use). Process 400 is not designed to create, control or modify the third party execution environment. Process 400 provides security through management of the received document as source input into a safe translated script for the target script processor of the third party execution environment.

Thus is provided in one embodiment, a computer-implemented process for securing a third party scripting environment receives a document to form a source input, defines a schema with functionality of an underlying target script language, wherein the schema allows only identified operations, applies the schema to the source input to generate clean language definitions and translates the clean language definitions into a translated script of a target script language.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of various aspects of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described above were chosen and described in order to explain various principles of the invention and the practical applications, and to enable others of ordinary skill in the art to understand the invention for various embodiments with various modifications as are suited to the particular use contemplated.

Various aspects of invention can take the form of an entirely hardware embodiment, an entirely software embodiment or an embodiment containing both hardware and software elements. In one embodiment, the invention is implemented in software, which includes but is not limited to firmware, resident software, microcode, and other software media that may be recognized by one skilled in the art.

While various aspects of the present invention have been described in the context of a functioning data processing system, those of ordinary skill in the art will appreciate that one or more aspects of the present invention are capable of being distributed in the form of a computer readable medium of instructions and a variety of forms and that one or more aspects of the present invention apply equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is to be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A computer-implemented method for securing a third party scripting environment, the computer-implemented method comprising:

receiving, by a computing device, a document to form a source input;

defining, by the computing device, a schema with functionality of an underlying target script language, wherein defining the schema comprises identifying operations for the target script language to form a group of identified operations, wherein only the identified operations are deemed safe in the target script language;

responsive to determining, by the computing device, that the source input includes at least one operation that is not included in the group of identified operations, rejecting the source input; and responsive to determining, by the computing device, that the source input includes only operations that are included in the group of identified operations:

applying, by the computing device, the schema to the source input to generate clean language definitions; and translating, by the computing device, the clean language definitions into a translated script of the target script language.

2. The computer-implemented method of claim 1, wherein translating the clean language definitions to the target script language further comprises:

determining whether to apply additional conditional processing to the clean language definitions;

responsive to the determination to apply the additional conditional processing to the clean language definitions, applying the additional conditional processing to the clean language definitions; and translating the clean language definitions into the translated script of the target script language.

3. The computer-implemented method of claim 2, wherein the additional conditional processing includes application of further controls, filters and constraints including restriction and denial of processing to predetermined amounts of data processing resources.

4. The computer-implemented method of claim 1, further comprising:

executing the translated script in a third party execution environment to form a result; and sending the result to a requester.

5. The computer-implemented method of claim 4, wherein the third party execution environment is capable of processing identified operations and unidentified operations, and wherein unidentified operations are deemed unsafe.

6. The computer-implemented method of claim 1, wherein the document remains unmodified.

7. A computer program product for securing a third party scripting environment, the computer program product comprising:

a computer-readable storage device containing computer executable program code stored thereon, the computer executable program code comprising:

computer executable program code to receive a document to form a source input;

computer executable program code to define a schema with functionality of an underlying target script language, wherein defining the schema comprises identifying operations for the target script language to form a group of identified operations, wherein only the identified operations are deemed safe in the target script language;

computer executable program code to reject the source input responsive to determining that the source input includes at least one operation that is not included in the group of identified operations;

computer executable program code to apply the schema to the source input to generate clean language definitions responsive to determining that the source input includes only operations that are included in the group of identified operations; and computer executable program code to translate the clean language definitions into a translated script of the target script language responsive to determining that the source input includes only operations that are included in the group of identified operations.

8. The computer program product of claim 7, wherein computer executable program code to translate the clean language definitions to the target script language further comprises:

computer executable program code to determine whether to apply additional conditional processing to the clean language definitions;

computer executable program code responsive to the determination to apply the additional conditional processing to the clean language definitions, to apply the additional conditional processing to the clean language definitions; and computer executable program code to translate the clean language definitions into the translated script of the target script language.

9. The computer program product of claim 6, wherein computer executable program code for the additional conditional processing includes computer executable program code for application of further controls, filters and constraints including restriction and denial of processing to predetermined amounts of data processing resources.

10. The computer program product of claim 7, further comprising:

computer executable program code to execute the translated script in a third party execution environment to form a result; and computer executable program code to send the result to a requester.

11. The computer program product of claim 10, wherein the third party execution environment is capable of processing identified operations and unidentified operations, and wherein unidentified operations are deemed unsafe.

12. The computer program product of claim 7, wherein the document remains unmodified.

13. An apparatus for securing a third party scripting environment, the apparatus comprising:

a communications fabric;

a computer-readable medium connected to the communications fabric, wherein the computer-readable medium contains computer executable program code;

a communications unit connected to the communications fabric;

an input/output unit connected to the communications fabric;

a display connected to the communications fabric; and a processor unit connected to the communications fabric, wherein the processor unit executes the computer executable program code to direct the apparatus to:

receive a document to form a source input;

define a schema with functionality of an underlying target script language, wherein defining the schema comprises identifying operations for the target script language to form a group of identified operations, wherein only the identified operations are deemed safe in the target script language;

responsive to determining that the source input includes at least one operation that is not included in the group of identified operations, reject the source input; and responsive to determining that the source input includes only operations that are included in the group of identified operations:

apply the schema to the source input to generate clean language definitions; and translate the clean language definitions into a translated script of the target script language.

14. The apparatus of claim 13, wherein the processor unit executing the computer executable program code to translate the clean language definitions to the target script language further directs the apparatus to:

determine whether to apply additional conditional processing to the clean language definitions;

responsive to the determination to apply the additional conditional processing to the clean language definitions, apply the additional conditional processing to the clean language definitions; and translate the clean language definitions into the translated script of the target script language.

15. The apparatus of claim 14, wherein the additional conditional processing includes application of further controls, filters and constraints including restriction and denial of processing to predetermined amounts of data processing resources.

16. The apparatus of claim 13, wherein the processor unit executing the computer executable program code further directs the apparatus to:

execute the translated script in a third party execution environment to form a result; and send the result to a requester.

17. The apparatus of claim 16, wherein the third party execution environment is capable of processing identified operations and unidentified operations, and wherein unidentified operations are deemed unsafe.

18. The apparatus of claim 13, wherein the processor unit executes the computer executable program code to determine that the source input includes at least one operation that is not included in the group of identified operations at least by executing computer executable program code to determine that the source input includes at least one operation that includes a directory in a file name.

19. The method of claim 1, wherein determining that the source input includes at least one operation that is not included in the group of identified operations comprises determining that the source input includes at least one operation that includes a directory in a file name.

20. The computer program product of claim 7, wherein the computer executable program code to determine that the source input includes at least one operation that is not included in the group of identified operations comprises computer executable program code to determine that the source input includes at least one operation that includes a directory in a file name.

* * * * *